US011241908B2

(12) United States Patent
Mansfield (10) Patent No.: US 11,241,908 B2
(45) Date of Patent: Feb. 8, 2022

(54) FLEX TRACK

(71) Applicant: Nicholas E. Mansfield, Frisco, TX (US)

(72) Inventor: Nicholas E. Mansfield, Frisco, TX (US)

( * ) Notice: Subject to any disclaimer, the term of this patent is extended or adjusted under 35 U.S.C. 154(b) by 327 days.

(21) Appl. No.: 16/400,967

(22) Filed: May 1, 2019

(65) Prior Publication Data

US 2019/0337330 A1     Nov. 7, 2019

Related U.S. Application Data

(60) Provisional application No. 62/664,956, filed on May 1, 2018.

(51) Int. Cl.
*B60B 15/26*     (2006.01)

(52) U.S. Cl.
CPC ........ *B60B 15/266* (2013.01); *B60B 2360/50* (2013.01)

(58) Field of Classification Search
CPC ......... B60B 15/18; B60B 15/24; B60B 15/26; B60B 15/266; B62D 55/08; B62D 55/084; B60C 27/20
See application file for complete search history.

(56) References Cited

U.S. PATENT DOCUMENTS

| 130,892 | A | * | 8/1872 | Brown | B60B 15/18 305/19 |
|---|---|---|---|---|---|
| 275,035 | A | * | 4/1883 | Gilbert | B60B 15/18 305/19 |
| 1,009,154 | A | * | 11/1911 | Knowles | B60B 15/18 305/19 |
| 1,068,563 | A | * | 7/1913 | Carr | B60B 15/18 305/19 |
| 1,106,841 | A | * | 8/1914 | Porteous | B60B 15/18 305/4 |
| 1,106,842 | A | * | 8/1914 | Porteous | B60B 15/18 305/4 |
| 1,107,492 | A | * | 8/1914 | Carr | B60B 15/18 305/19 |
| 1,297,493 | A | * | 3/1919 | Reid | B60B 15/18 305/3 |
| 2,950,148 | A | * | 8/1960 | Weier | B62D 55/04 305/113 |
| 3,251,392 | A | * | 5/1966 | Connell | B60C 27/20 152/228 |

(Continued)

*Primary Examiner* — Jason R Bellinger
(74) *Attorney, Agent, or Firm* — Wilson Daniel Swayze, Jr.

(57) ABSTRACT

A vehicle track system to increase the contact patch of the tires on a vehicle for use in sand, snow, or soft soil is disclosed. The vehicle track system is a quickly installed vulcanized rubber sections draped over the tire and secured with very strong over-center latches. The over center latches are used for closing the wrapped rubber track with some fine threaded adjustment and an over center clamp. Steel pins are used to link the individual track to tread together. The over center clamp is adjustable in length, allowing for fine tuning of the fit of the track on the tire. The vehicle track system works for almost any size tire and provides more width for dual wheels. The vehicle track system is easily installable and provides a large footprint that enables a vehicle to cross terrain.

14 Claims, 9 Drawing Sheets

(56) References Cited

U.S. PATENT DOCUMENTS

| | | | | | |
|---|---|---|---|---|---|
| 3,387,896 | A | * | 6/1968 | Sobota | B60C 27/08 |
| | | | | | 305/160 |
| 3,595,294 | A | * | 7/1971 | Strelli | B60C 27/14 |
| | | | | | 152/245 |
| 3,601,212 | A | * | 8/1971 | Peterson | B60C 27/20 |
| | | | | | 180/9.44 |
| 3,720,448 | A | * | 3/1973 | Allen | B62D 55/28 |
| | | | | | 152/185.1 |
| 3,776,291 | A | * | 12/1973 | Boggs | B60C 27/20 |
| | | | | | 152/185.1 |
| 3,871,720 | A | * | 3/1975 | Mosshart | B62D 55/275 |
| | | | | | 152/185.1 |
| 4,089,565 | A | * | 5/1978 | Loegering | B60C 27/20 |
| | | | | | 305/204 |
| 4,964,193 | A | * | 10/1990 | Rommelfaenger | E05D 11/082 |
| | | | | | 16/225 |
| 5,004,030 | A | * | 4/1991 | McLaughlin | B60B 15/18 |
| | | | | | 152/169 |
| 5,454,413 | A | * | 10/1995 | Morelli | B60C 27/20 |
| | | | | | 152/187 |
| 8,042,629 | B2 | * | 10/2011 | Mackenzie | B62D 55/04 |
| | | | | | 180/9.21 |
| 10,889,339 | B1 | * | 1/2021 | Leaveck | B62D 55/084 |
| 10,933,687 | B1 | * | 3/2021 | Patrick | B60B 15/22 |
| 2004/0045136 | A1 | * | 3/2004 | Musil | F16G 3/08 |
| | | | | | 24/37 |

* cited by examiner

FLEX TRACK

BACKGROUND OF THE INVENTION

A. Technical Field

The present invention generally relates to a vehicle track system. More specifically, the present invention relates to a flexible vehicle track system, designed to increase the contact patch of the tires on the vehicle for use in sand, snow, or soft soil.

B. Description of Related Art

In 1770 Richard Edgeworth designed a first ever known continuous track system. The track was crude, and no propulsion system was available other than horse-drawn power. So, the system had limited uses. Other designs for a continuous track system continued to evolve through the 1800s. Further, inventor Henry Stith developed a continuous track system and patented. Stith received several patents on his invention. The last patent was a bicycle-based system for off-road riding. His surviving family still maintains the prototype. Frank Beamond, a British inventor designed, built and patented caterpillar tracks and patented them in number of countries in the early 1900s.

Further, a steam-powered log hauler was designed and built at the Waterville Iron Works in Maine in the year 1901 by Alvin Lombard. The log hauler was named the Lombard Steam Log Hauler. Lombard was also granted a patent for his creation. In Great Britain, the continuous track vehicle was developed by a British agricultural company, Hornsby in Grantham in 1905. The military in Britain began to test Hornsby tractors for use as artillery tractors for the British army but was not adopted at that time. The caterpillar name was coined during a military test. The military applied the continuous track to a prototype vehicle and became convinced that it was possible to develop a fighting vehicle.

Further, the tracked vehicles are proved to be far superior to wheeled vehicles in rough and wet terrains as well as loose soils and sand. Up to this point, vehicle tracks were constructed of linked steel plates. Some of the manufactures of agricultural products began to utilize rubber tracks instead of the steel. The rubber was lighter, make less noise, create less ground pressure and do not damage paved roads.

However, when an operator of a vehicle wants to go into the loose sand, soft soil, or snow, they take their chances with the off-road tire design, add chains, or remove the wheels/tires and add very expensive track assemblies. The tire width, lug design, and addition of chains helps to improve the traction but does not solve the footprint size, allowing the vehicle to get stuck. Adding the track assemblies is not done spontaneously at the site and driving the vehicle on the street with the tracks installed is time consuming due to the reduced top speed. Track wear on the street is detrimental and replacement tracks are costly.

Therefore, there is a need for a track system for vehicles to enable travel on roads at speed, and the ability to traverse deep sand and mud when necessary, with the same vehicle.

SUMMARY OF THE INVENTION

The present invention generally relates to a vehicle track system. More specifically, the present invention relates to a flexible vehicle track system, designed to increase the contact patch of the tires on the vehicle for use in sand, snow, or soft soil.

In one embodiment, a flexible vehicle track system comprises a track assembly and a latch. The track assembly comprises a plurality of track members, the track assembly comprises a first end and a second end. Each track member comprises a traction lug disposed on a surface engaging a ground, and a side lug disposed on a surface engaging a tire of a vehicle. In one embodiment, the traction lug is a wire reinforced traction lug. In one embodiment, each track member is a 700-durometer vulcanized rubber. The latch comprises a male mating section extends from the first end of the track assembly and a female mating section extends from the second end of the track assembly, wherein the male mating section is configured to mate with the female mating section. The track assembly is configured to wrap around the tire and locks with the latch to provide extra support and traction on soft or sandy terrain.

Further, each track member comprises a recess on the surface engaging the tire of the vehicle. In one embodiment, the plurality of track members is pivotally interconnected. The system further comprises one or more pins configured to pivotally interconnect the plurality of track members. In one embodiment, the pins are coated with steel to provide strength and lubricity. The track assembly is configured to increase a footprint of each tire. The track assembly is further configured to adjust in length for application on any tire size. The track assembly is further configured to customize in length and width to fit on the tire's circumference.

The latch comprises an over center clamp installed on the recess of the track assembly using steel rivets. In one embodiment, the latch is made of anodized aluminum stampings. The over center clamp anchors are riveted to an anodized aluminum surface. The over center clamp anchors are configured to adjustable in length for fine tuning of the fit of the track assembly on the tire. The over center clamp is further configured to prevent slippage of the track assembly on the periphery of the tire. The vehicle track system is configured to enable easy removal and storage.

In another embodiment, the vehicle track system made from wire reinforced, vulcanized rubber sections, which are draped over the tire and secured with very strong over-center latches, is disclosed as follows. The side location lugs or side lugs keep the appliance on the tire and the cup shaped traction lugs bite into the soil or sand to enhance the traction. The significantly larger footprint at each tire allows movement of the vehicle while reducing the probability of getting stuck. The over-center latches are stamped aluminum alloy sheet stock. The latches consist of the male and female mating sections. The end sections have the over-center clamps and the anchors installed on the interior surface of the track using steel rivets.

In an embodiment, the over center latches are used for closing the wrapped rubber track with some fine threaded adjustment and an over center clamp. The recess in the backside of the vehicle track system helps to keep the tire from slipping out of the track system and promotes smooth riding. Steel pins link the individual track to tread together. The rubber/track sections are fabricated using modified rubber tire assembly techniques.

In an embodiment, the pins hold the sections together and provide the required strength and lubricity. The rubber sections are around the steel cords in the center of the rubber. The assembled track wraps around the tire to provide extra support and traction on soft or sandy terrain. A female section accepts the nose of the male section on the opposite end of the track. The vehicle track system effectively increases the footprint of each tire. The vulcanized bars on the side keep the track centered on the tire as it is being driven by the tire during use.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

The present invention relates to a vehicle track system 100 to increase the contact patch of the tires on the vehicle, as shown in FIG. 1 to FIG. 8. In an embodiment, the vehicle track system 100 is a quickly and easily installed track-like system, made from wire reinforced, vulcanized rubber sections, which are draped over the tire and secured with very strong over-center latches 101. The side location lugs or side lugs 110 keep the appliance on the tire and the cup shaped traction lugs bite into the soil or sand to enhance the traction. The significantly larger footprint at each tire allows movement of the vehicle while reducing the probability of getting stuck. In another embodiment, the over-center latches 101 are stamped aluminum alloy sheet stock. The latches 101 consist of the male and female mating sections 105. The latch 101 is manufactured from the sheet stock using a numerically controlled water jet machining center, followed by a CNC milling center. After fabrication and cleaning, the sheets are hard anodized to provide the optimum in surface hardness to resist scratching during use. The end sections of the latches 101 have the over-center clamps 109 and the anchors 108 installed on the recess 103 of the track using steel rivets.

Figure 1:
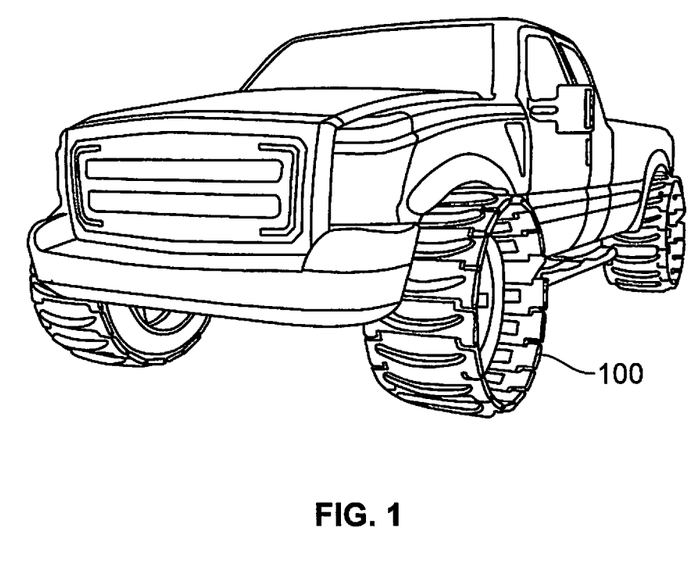
FIG. 1 illustrates a vehicle track system to increase the contact patch of the tires on the vehicle, incorporating the aspects of the present invention.
Figure 2:
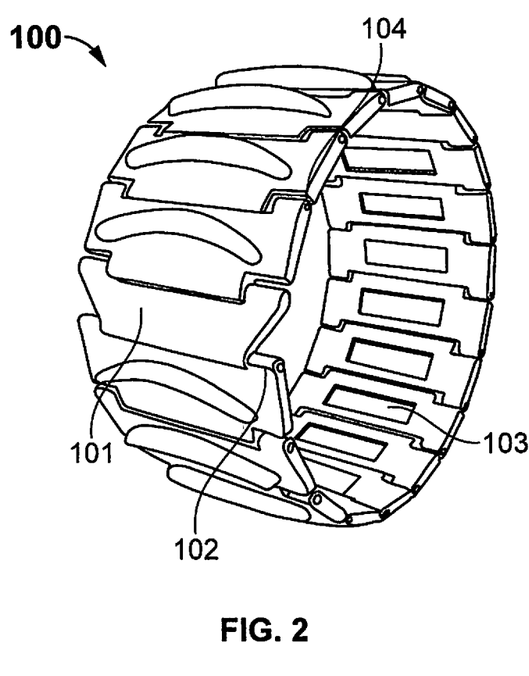
FIG. 2 illustrates a perspective view of the vehicle track system to increase the contact patch of the tires on the vehicle, incorporating the aspects of the present invention.

FIG. 2 illustrates a perspective view of the vehicle track system 100 to increase the contact patch of the tires on the vehicle, incorporating the aspects of the present invention. In another embodiment, the over center latches 101 are used for closing a track assembly comprising a plurality of track members 102 with some fine threaded adjustment and an over center clamp 109. The recess 103 in the backside of the vehicle track system 100 helps to keep the tire from slipping out of the track system 100 and promotes smooth riding. Steel pins 104 link the individual track to tread together.

Figure 3:
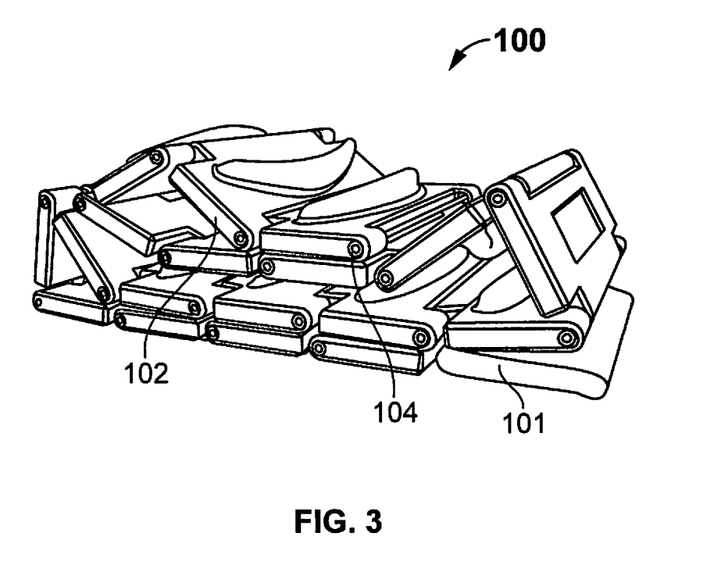
FIG. 3 illustrates a folded track of the vehicle track system prepared for storage, incorporating the aspects of the present invention.
Figure 4:
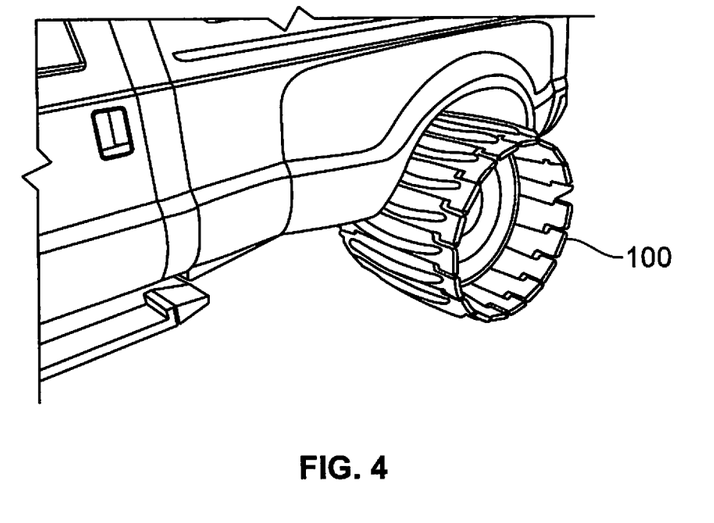
FIG. 4 illustrates the vehicle track system to be used in dual tires, incorporating the aspects of the present invention.
Figure 5:
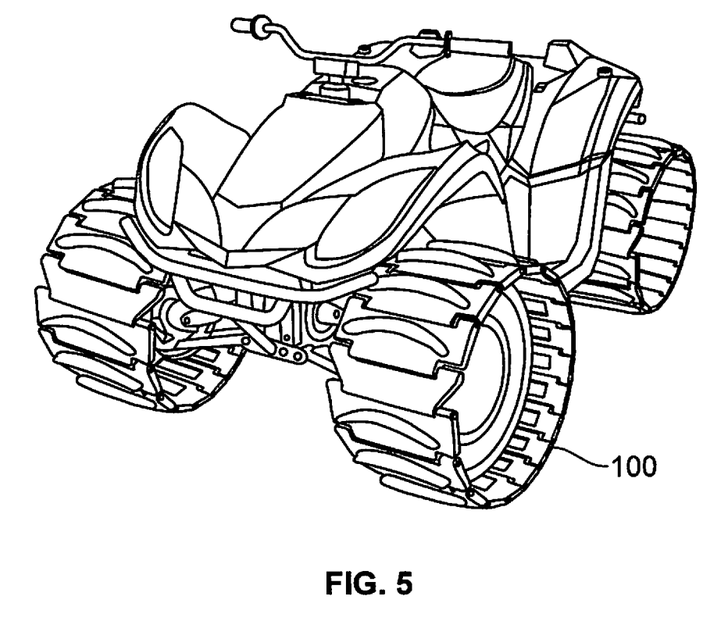
FIG. 5 illustrates the vehicle track system to be used on recreational vehicles, incorporating the aspects of the present invention.

The vehicle track system 100 is folded when prepared for storage, as shown in FIG. 3. In an embodiment, rubber/track sections 102 are fabricated using modified rubber tire assembly techniques. The sections of the vehicle track system 100 are fabricated using brass plated steel wires 106. The wires 106 are stored in a temperature and humidity-controlled environment. Then they run through roller and coated with a thin layer of skim rubber. Further, they are woven into the stabilizing insert and then the insert is placed in the extruder, where the section shape is created. After that, the track section 102 is transferred to the vulcanizer, where it is cured using heat and pressure. After vulcanizing, the track section 102 proceeds to the final finishing station for any trimming and inspection. In another embodiment, the vehicle track system 100 could be used in dual tires as shown in FIG. 4. In yet another embodiment, the vehicle track system 100 could be used in any recreational vehicles, as shown in FIG. 5. The vehicle track system 100 is manufactured in any variable length and breadth. So, the vehicle track system 100 is customizable for any kind of wheels and vehicle varying in shape and size.

Figure 6:
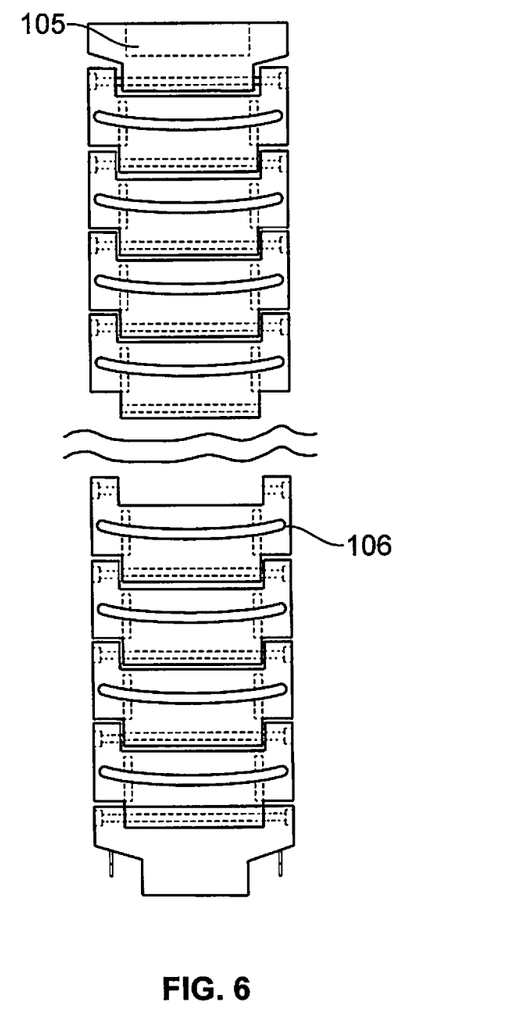
FIG. 6 illustrates a top view of the vehicle track system side towards ground, incorporating the aspects of the present invention.

FIG. 6 illustrates a top view of the vehicle track system 100 side towards ground, incorporating the aspects of the present invention. In an embodiment, the ends are latches 101 that mate together to join the vehicle track system 100 around the tire. The pins 104 holds the sections together and provide the required strength and lubricity. The rubber sections 102 are around the steel cords in the center of the rubber. The assembled track wraps around the tire to provide extra support and traction on soft or sandy terrain. The female mating section or female section 105 accepts the nose of the male mating section or male section on the opposite end of the track. The vehicle track system 100 effectively increases the footprint of each tire. In another embodiment, the vehicle track system 100 is easy to install before venturing out onto loose or terrain that the user does not wish to compact. In a preferred embodiment, the pivot pins 104 are turned from a steel rod using a CNC lathe. After turning the pivot pin 104 and the swaged end piece, all the pieces are cleaned, etched, and then dip coated in molten polypropylene plastic. After cooling and trimming, the pivot pins 104 are fed into the axle retainer channels in the rubber track sections 102. Then the pins 102 are secured using very high-pressure compression to permanently swage the pin 104 and retainer together. Each assembly is adjusted using the number of sections to fit the desired tire circumference.

Figure 7:
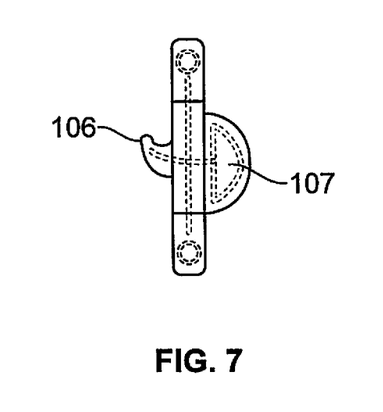
FIG. 7 illustrates vulcanized bars of the vehicle track system on the tire side, incorporating the aspects of the present invention.

The vehicle track system 100 is commonly stored in the truck box. The vehicle track system 100 is removed from the storage and installed, when traction is lost, or the vehicle is stuck. The wire reinforced raised cup shaped traction lugs 110 provide significantly enhanced traction in sandy, muddy, or snowy conditions. FIG. 7 illustrates vulcanized bars 107 of the vehicle track system 100 on the tire side, incorporating the aspects of the present invention. The vulcanized bars 107 on the side keep the track centered on the tire as it is being driven by the tire during use. In a preferred embodiment, the latches 101 are made up of anodized aluminum stampings. The pins 104 are of steel coated with plastic to provide strength and lubricity. The track location bars 107 is offset to make the track located farther to the outside of the tire, so the turning radius is not affected as severely. If this technique is used, then the vehicle track system 100 could be manufactured in left side and right side of tracks, in pair.

Figure 8:
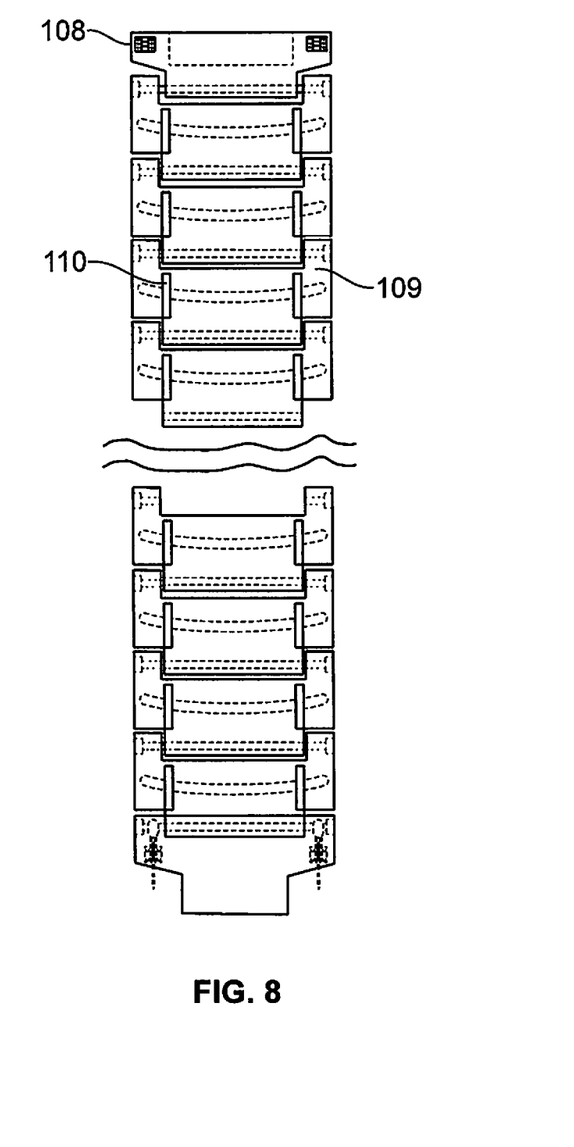
FIG. 8 illustrates a side view of the vehicle track system side towards tire, incorporating the aspects of the present invention.
Figure 9:
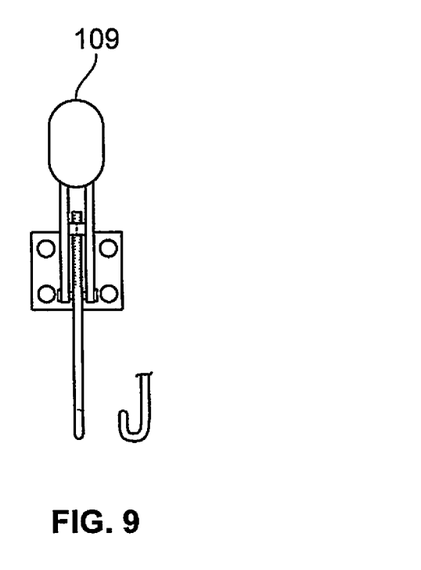
FIG. 9 illustrates over center clamps of the vehicle track system, incorporating the aspects of the present invention.

FIG. 8 illustrates a side view of the vehicle track system 100 side towards tire, incorporating the aspects of the present invention. The length of the vehicle track system 100 is customizable to any length and width to fit the tire's circumference. So, the vehicle track system 100 is not loose and the end sections are fully seated without stressing the pins. The rubber track sections 102 are impact resistant yet flex somewhat to give when they strike an obstacle, allowing contact to be maintained as they move over the terrain. The track location lugs 110 extend down well past the edge of the tire and are wire reinforced to provide good side to side control during harsh use. The over center clamp anchors 108 are riveted to the anodized aluminum surface latches 101. The number of sections is adjusted at the factory to make the finished length of track required for each application's tire size. The over center clamp 109 is adjustable in length, allowing for fine tuning of the fit of the track on the tire. In a preferred embodiment, the anchors 108 hold the 375 pounds clamping force with a significant margin. FIG. 9 illustrates over center clamps 109 of the vehicle track system 100, incorporating the aspects of the present invention. In an embodiment, the over center clamp 109 has a high holding strength preventing slippage of the track on the periphery of the tire. After use, the rubber and metal tracks can be pressure washed and air dried before storage.

In a preferred embodiment, the vehicle track system 100 provides a large footprint that will enable a vehicle to cross terrain which is difficult for all normal vehicles without track system. The ability to break down the vehicle track system 100 and store it in the vehicle or for 4-wheelers or other all-terrain vehicles gives the driver the advantage of knowing the vehicle could be converted at any time. Latches 101 has robust mechanism and is adjustable. The vehicle track system 100 provides availability of more width for dual wheels. The rubber section 102 used as tracks to perform heavy duty. Recess 103 inside of vehicle track system 100 keeps vehicle wheel inside and centrally adhered. Strong steel pins 104 hold rubber treads of the track section 102 together. The vehicle track system 100 works for almost any size tire.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A flexible vehicle track system, comprising:
a track assembly comprising a plurality of track members, the track assembly comprises a first end and a second end, each track member comprises:
a traction lug disposed on a surface engaging a ground, and
a side lug disposed on a surface engaging a tire of a vehicle;
a latch comprising a male mating section extends from the first end of the track assembly and a female mating section extends from the second end of the track assembly, wherein the male mating section is configured to mate with the female mating section, wherein the track assembly is configured to wrap around the tire and locks with the latch to provide extra support and traction on soft or sandy terrain, and wherein the latch comprises an over center clamp installed in a recess of the track assembly using steel rivets.

2. The vehicle track system of claim 1, wherein each track member comprises a recess on the surface engaging the tire of the vehicle.

3. The vehicle track system of claim 1, wherein the plurality of track members is pivotally interconnected.

4. The vehicle track system of claim 1, further comprises one or more pins configured to pivotally interconnect the plurality of track members.

5. The vehicle track system of claim 1, wherein the traction lug is a wire reinforced traction lug.

6. The vehicle track system of claim 4, wherein the pins are formed with steel to provide strength and lubricity.

7. The vehicle track system of claim 1, wherein the track assembly is configured to adjust in length for application on any tire size.

8. The vehicle track system of claim 1, wherein the track assembly is configured to increase a footprint of each tire.

9. The vehicle track system of claim 1, is configured to enable removal and storage.

10. The vehicle track system of claim 1, wherein the latch is made of anodized aluminum stampings.

11. The vehicle track system of claim 1, wherein each track member is a 700-durometer vulcanized rubber.

12. The vehicle track system of claim 1, wherein the over center clamp is riveted to an anodized aluminum surface.

13. The vehicle track system of claim 1, wherein the over center clamp is configured to adjustable in length for tuning of the fit of the track assembly on the tire.

14. The vehicle track system of claim 1, wherein the over center clamp is configured to prevent slippage of the track assembly on the periphery of the tire.

\* \* \* \* \*